(12) United States Patent
Roe (10) Patent No.: US 10,807,021 B2
(45) Date of Patent: Oct. 20, 2020

(54) SYSTEM AND METHOD FOR TREATING LIQUIDS AND SOLUTIONS TO REMOVE AND/OR SEPARATE COMPONENTS THEREOF USING STABILIZED GAS INFUSED LIQUIDS

(71) Applicant: Cliffton Lee Roe, Harrison Township, MI (US)

(72) Inventor: Cliffton Lee Roe, Harrison Township, MI (US)

(73) Assignee: Gaps Technology, LLC, Slidell, LA (US)

( * ) Notice: Subject to any disclaimer, the term of this patent is extended or adjusted under 35 U.S.C. 154(b) by 620 days.

(21) Appl. No.: 15/412,684

(22) Filed: Jan. 23, 2017

(65) Prior Publication Data

US 2017/0209814 A1 Jul. 27, 2017

Related U.S. Application Data

(60) Provisional application No. 62/286,095, filed on Jan. 22, 2016.

(51) Int. Cl.
*B01D 21/00* (2006.01)
*B01D 21/24* (2006.01)
*B01D 19/00* (2006.01)
*B01D 53/22* (2006.01)
*C10G 29/02* (2006.01)
*B01D 17/02* (2006.01)

(52) U.S. Cl.
CPC ..... *B01D 21/0084* (2013.01); *B01D 17/0205* (2013.01); *B01D 17/0208* (2013.01);
(Continued)

(58) Field of Classification Search
CPC ............ B01D 21/0084; B01D 21/0012; B01D 21/2461; B01D 21/2444; B01D 21/009;
(Continued)

(56) References Cited

U.S. PATENT DOCUMENTS 3,831,758 A * 8/1974 Watson, Jr. .............. B03D 1/24
210/199
7,008,535 B1 3/2006 Spears et al.
(Continued)

*Primary Examiner* — Prem C Singh
*Assistant Examiner* — Brandi M Doyle
(74) *Attorney, Agent, or Firm* — Carrier Blackman & Associates, P.C.; Joseph P. Carrier; William D. Blackman (57) ABSTRACT

A system for treating liquids and solutions for separating components thereof, the system including a treatment vessel having a treatment chamber therein, a device for generating a gas-infused liquid under elevated pressure, and a device for stabilizing the gas-infused liquid such that most of the gas infused into the liquid by the device for generating a gas-infused liquid will remain in the liquid if pressure of the liquid is reduced to atmospheric pressure, and for flowing the stabilized gas-infused liquid into the treatment chamber so as to form a liquid layer including the stabilized, gas-infused liquid in the treatment chamber. The treatment vessel includes a discharge port through which some of the stabilized, gas-infused liquid in the liquid layer may be discharged from the treatment vessel, the withdrawn liquid is infused with an additional amount of the gas, again stabilized, and again flown the liquid into the treatment chamber.

11 Claims, 1 Drawing Sheet

(52) U.S. Cl.
CPC ....... *B01D 19/0005* (2013.01); *B01D 21/009* (2013.01); *B01D 21/0012* (2013.01); *B01D 21/0087* (2013.01); *B01D 21/2416* (2013.01); *B01D 21/2433* (2013.01); *B01D 21/2444* (2013.01); *B01D 21/2461* (2013.01); *B01D 21/2488* (2013.01); *B01D 53/229* (2013.01); *C10G 29/02* (2013.01); *C10G 2300/202* (2013.01)

(58) Field of Classification Search
CPC ............ B01D 21/0087; B01D 21/2416; B01D 21/2405; B01D 19/0005; B01D 53/229; B01F 3/04; B01F 3/04099; B01F 3/04241; B01F 3/0446; B01F 3/04503; B01F 5/10; B01F 2215/0036; C10G 1/00; C10G 1/04; C10G 1/045; C10G 29/02; C10G 2300/202
See application file for complete search history.

(56) References Cited

U.S. PATENT DOCUMENTS

| | | |
|---|---|---|
| 7,294,278 B2 | 11/2007 | Spears et al. |
| 8,500,104 B2 | 8/2013 | Spears et al. |
| 9,308,505 B2 | 4/2016 | Spears et al. |
| 9,527,046 B1 | 12/2016 | Roe |
| 2011/0089013 A1* | 4/2011 | Sakurai .............. B01D 17/0205 201/2 |

\* cited by examiner

SYSTEM AND METHOD FOR TREATING LIQUIDS AND SOLUTIONS TO REMOVE AND/OR SEPARATE COMPONENTS THEREOF USING STABILIZED GAS INFUSED LIQUIDS

CROSS-REFERENCE TO RELATED APPLICATIONS

The present application claims the benefit of priority to U.S. Provisional Patent Application No. 62/286,095, filed Jan. 22, 2016. The entire subject matter of these priority documents, including specification claims and drawings thereof, is incorporated by reference herein.

BACKGROUND OF THE INVENTION

Field of the Invention

The present disclosure relates to a novel system and method for treating liquids to remove and/or separate components thereof using stabilized gas infused liquids. More particularly, the present disclosure relates to such a system and method which can safely, quickly, and very efficiently remove and/or separate components from liquids and solutions down to the molecular and/or atomic levels using highly stabilized gas infused liquids.

Background

Many systems and methods are known that make use of liquids infused with a gas. For example, the present inventor has previously proposed such systems and methods which are disclosed in International Application PCT/US2014/064727, filed 10 Nov. 2014, which claims priority from U.S. Provisional Application 61/904,755, and more recently in U.S. Utility application Ser. No. 14/991,534, filed 8 Jan. 2016 (now U.S. Pat. No. 9,527,046 B2). Other known systems for generating stabilized gas-infused liquids and using same include those disclosed in U.S. Pat. Nos. 7,008,535, 7,294,278, 8,500,104 and 9,308,505, each to Spears et al. The entire disclosures of the discussed applications and patents are incorporated herein by reference.

The present inventor's previously proposed such systems and methods are primarily focused on novel devices and processes which are used to generate stabilized, gas-infused liquids. However, the previous disclosures also generally discuss that the stabilized, gas-infused liquids which are generated may be advantageously used in numerous different manners for achieving a wide variety of desirable effects, and also generally mention some specific, possible applications.

Although the present inventor's previous disclosures discussed above provide significant advantages over the other previously known systems and methods, desiderata still exist in the art for specific applications in which the stabilized, gas-infused liquids may be used for treating specific materials to efficiently and safely remove specific component(s) therefrom.

SUMMARY OF THE INVENTION

The present invention has been created with the object of satisfying the discussed desiderata.

The present inventor has studied stabilized, gas-infused liquids at great length, including the stabilized, gas-infused liquids generated with the systems and methods disclosed in U.S. Utility application Ser. No. 14/991,534 in which the infused gases are believed to be completely dissolved in the liquids, and discovered the present invention which uses such stabilized, gas-infused liquids in a system and method for safely, quickly, and very efficiently removing and/or separating components from liquids and solutions down to the molecular and/or atomic levels. Essentially, the present invention goes beyond the present inventor's previous disclosures and provides new specific systems and methods involving use of the highly stabilized, gas-infused liquids. The systems and methods disclosed herein may be operated in a continuous manner with continuous inputs and outputs, may be operated in a batch manner in which given quantities of inputs are combined and allowed to react for a period of time and then discharged, and may involve multiple reaction vessels.

According to a first aspect of the present invention there is provided a system for treating hydrocarbon based liquids and solutions such as crude oil for separating components thereof, the system including: a treatment vessel having a treatment chamber therein; a device which generates a gas-infused treatment liquid containing a supersaturated amount of gas; and a device which stabilizes the gas-infused treatment liquid and disperses the stabilized, gas-infused treatment liquid into a lower portion of the treatment chamber, so as to form a lower liquid layer of the stabilized, gas-infused treatment liquid in a lower portion of the treatment chamber in which the lower liquid layer becomes supersaturated with the gas at an operating temperature and pressure within the treatment vessel, and to continuously withdraw a portion of the liquid from the lower liquid layer, re-infuse and re-stabilize the portion of the liquid with the supersaturated amount of the gas, and returning the re-infused and re-stabilized the portion of the liquid into the lower portion of the treatment chamber, and the treatment vessel includes an input port for a hydrocarbon liquid to be treated disposed at an intermediate level on one side, and at least two outlet ports disposed at different intermediate levels on an opposite side of the treatment vessel above the lower liquid layer.

Such system according to the first aspect may additionally include a means for treating any gas(es) that may be generated and collected in the main treatment vessel, including a pump for withdrawing a portion of the collected gas(es) and a diffuser disposed the lower liquid layer and through which the withdrawn portion of collected gas(es) is injected into the lower liquid layer in the form of small, coarse bubbles, an air dam which captures another portion of any gas(es) that may be generated in the main treatment vessel, a filter for removing undesired components of the gas(es) captured by the air dam, and a vent through which the filtered, captured gas(es) are discharged from the vessel to atmosphere.

Such system according to the first aspect may additionally include a means for removing any solids that may accumulate in a bottom portion of the main treatment vessel, including a valve connected to a bottom drain of the treatment vessel, a pump which withdraws a portion of the liquid in the lower liquid layer together with any solid matter contained therein, a filter which removes the solid matter from the withdrawn portion of liquid, and a return line through which the filtered portion of liquid is returned to the lower liquid layer within the treatment vessel.

According to a second aspect of the present invention, there is provided a method for treating hydrocarbon based liquids and solutions such as crude oil for separating components thereof in a continuous manner of operation, the system including steps of:

providing a treatment vessel having a treatment chamber therein; generating a stabilized, gas-infused treatment liquid containing a supersaturated amount of gas, and inputting the stabilized, gas-infused treatment liquid into a lower portion of the treatment chamber to form a lower liquid layer of the stabilized, gas-infused treatment liquid in a lower portion of the treatment chamber in which the lower liquid layer becomes supersaturated with the gas at an operating temperature and pressure within the treatment vessel;

introducing a hydrocarbon liquid to be treated at an intermediate level on one side of the treatment vessel above the lower liquid level, and withdrawing components of the hydrocarbon liquid through at least two outlet ports disposed at different intermediate levels on an opposite side of the treatment vessel above the lower liquid layer such that the hydrocarbon liquid flows from the one side of the treatment vessel to the other side thereof; continuously withdrawing a portion of the liquid from the lower liquid layer, re-infusing and re-stabilizing the withdrawn liquid with a supersaturated amount of the gas, and returning the re-infused and re-stabilized liquid into the lower portion of the treatment chamber such that an excess amount of the gas above the supersaturated amount is released from the lower liquid layer in the form of micro bubbles and/or nano bubbles which float upwardly through the hydrocarbon liquid such that molecules of the gas contained in the bubbles bonds to molecules of the hydrocarbon liquid through at least one of covalent bonding and ionic bonding. The liquid that is infused with gas may be water and the gas(es) that are infused in the liquid may be oxygen and/or carbon dioxide.

With such method according to the second aspect of the invention, the molecular level bonding of the gas molecules to the hydrocarbon molecules is very effective for promoting separation of solid matter from the hydrocarbon liquid because the gas molecules displace or reduce the density of the hydrocarbon liquid, which causes the solid matter, e.g., particulates of micro size solids, to be displaced from the hydrocarbon molecules, after which the displaced solid matter will sink through the hydrocarbon liquid and the gas-infused water in the lower liquid layer 6 via gravity and collect in the bottom portion of the vessel 1, where the collected solid matter may be periodically discharged from the vessel. Further, when the nano bubbles and micro bubbles rise up through the hydrocarbon liquid as such liquid flows from the inlet port to the outlet ports the continuous rise of the nano and micro bubbles also supersaturates the hydrocarbon liquid with the gas contained in the bubbles, which displaces some of the hydrocarbon liquid to a lesser density at a molecular level. This very advantageously causes undesirable or contaminating organic matter of lesser density within the hydrocarbon liquid to rise upwardly toward the upper surface of liquid in the treatment vessel, thus separating the hydrocarbon liquid introduced via the inlet port into the different layers based on density, which essentially corresponds to molecular structure, by the time the liquid is discharged from the vessel via the outlet ports. In practice, the component(s) of the hydrocarbon discharged through the lower of the discharge ports are the most desirable components of the hydrocarbon liquid, while the component(s) of the hydrocarbon discharged through the higher of the discharge ports are less desirable components of the hydrocarbon liquid.

Such method according to the second aspect may additionally include steps of withdrawing a portion of any gas(es) that may be generated and collected in the treatment vessel, and injecting the withdrawn portion of collected gas(es) into the lower liquid layer in the form of small, coarse bubbles, capturing another portion of any gas(es) that may be generated in the treatment vessel, filtering undesired components of the captured gas(es), and a venting the filtered, captured gas(es) from the vessel to atmosphere.

Such method according to the second aspect may additionally include steps of withdrawing a portion of the liquid in the lower liquid layer together with any solid matter contained therein, filtering the withdrawn portion of liquid to remove the solid matter from, and returning the filtered portion of liquid to the lower liquid layer within the treatment vessel.

For a more complete understanding of the present invention, the reader is referred to the following detailed description section, which should be read in conjunction with the accompanying drawing showing a present exemplary embodiment of the invention. Throughout the following detailed description and in the drawings, like numbers refer to like parts.

Intent of Disclosure

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

There have been chosen a specific exemplary embodiment of a system and method according to the present invention and specific alternative structures and modifications thereto. The exemplary embodiment chosen for the purposes of illustration and description of the structure and method of the invention are shown in the accompanying drawing forming a part of the specification.

DETAILED DESCRIPTION OF PRESENT EXEMPLARY EMBODIMENTS

Figure 1:
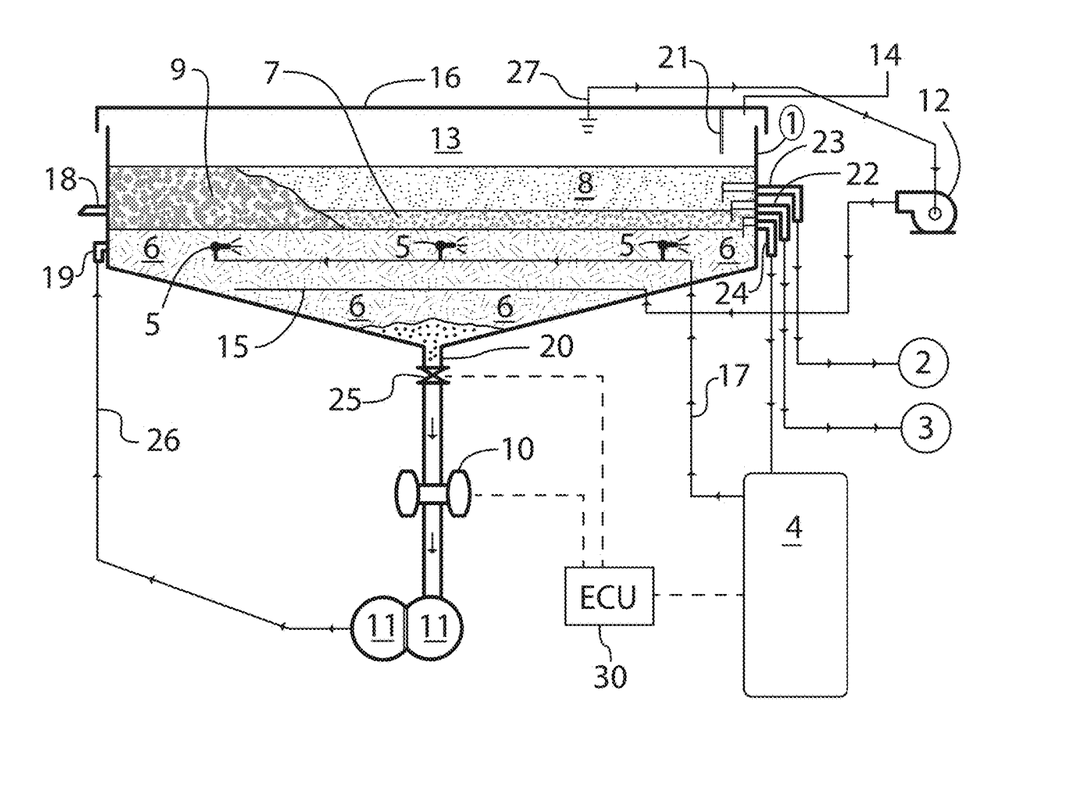
FIG. 1 is a schematic view of a system for treating hydrocarbon based liquids and solutions such as crude oil for separating components thereof using a stabilized, gas-infused aqueous liquid in a continuous or batch manner of operation according to an exemplary embodiment of the present invention.

With reference to FIG. 1 there is shown a schematic diagram of a system according to an exemplary embodiment of the present invention which may be used for treating various contaminated liquids by efficiently separating undesired components therefrom, and involving technology which stably infuses relatively large quantities of gas into liquids. The various contaminated liquids which may be treated include hydrocarbon based liquids and solutions, aqueous solutions, etc. and the system may be selectively operated in either a batch mode or a continuous mode depending on what is desired. Not all of the features of the depicted embodiment may be required depending on what contaminated liquid is being treated.

The system in the exemplary embodiment generally includes a main treatment vessel 1 with several input ports for inputting materials therein and multiple output ports for selectively discharging materials therefrom, a device 4 for infusing relatively large quantities of gas into liquids, one or more devices 5 for stabilizing the gas-infused liquid after it is discharged from the device 4 and for flowing the stabilized, gas-infused liquid into the main treatment vessel 1, means including a pump 10 and filter system 11 for removing any solids that may accumulate in a bottom portion of the main treatment vessel 1, and means including pump 12, air dam 21, filter 14, and coarse air diffuser 15 for capturing, treating and/or releasing any gas(es) that may be generated or released and collected in an upper portion of the main treatment vessel. The system may also include various sensors associated with the system such as pressure, temperature, level, and flow sensors, and controllable components such as motors which drive the pumps and solenoids which open/close valves, etc. during a treatment operation involving the system. Although these sensors and some of the controllable components are not shown, they would be used in conventional manners, as understood by persons of ordinary skill in the art. Further the system may include a controller such an electronic control unit (ECU) 30 which executes program(s) stored in a memory of the ECU or the like, receives inputs from the sensors and controls operations of motors, pumps, valves, and other controllable components of the system in an automated or desired manner.

The main treatment vessel 1 may be a closed vessel with an enclosed treatment chamber defined therein so that materials inputted into the vessel and any gasses that may be generated or released within the vessel will be contained. For this purpose, the main vessel 1 may include a cover 16 that may be selectively opened or removed for accessing the treatment chamber, and selectively secured to the vessel 1 in a liquid-tight and air-tight manner. Given that the system may be operated in a continuous manner, the main treatment vessel may be generally rectangular and elongate in shape to facilitate a uniform flow of liquids from one (input) side thereof to an opposite (output) side thereof, although the bottom portion of the vessel may be sloped or conically shaped to facilitate collection and discharge of solid matter from a bottom drain 20 of the vessel. The vessel 1 may otherwise have any desired shape, including cylindrical.

The main treatment vessel 1, as well as the lines used to flow various materials into and out of the main vessel, the will be sufficiently large to accommodate a desired throughput, and should be made of materials that will not be adversely affected by the liquids and/or other materials that are introduced into the vessel, or by temperatures and pressures at which the liquids and solutions are being treated. For example, the main treatment vessel 1 and lines may be constructed of stainless steel, or steel having a protective coating such as polytetrafluoroethylene applied to surfaces thereof.

An input port 18 for flowing a liquid or e treated 9, such as crude oil, may be disposed at one side or end of the vessel 1, and output ports 22, 23 for discharging different components separated from the solution to be treated may be disposed at the opposite side or end of the vessel from the input port 18 as shown. This arrangement is also very suitable for a continuous treatment operation as it helps to flow of the input liquid from the one side/end to the other side/end. While only one input port 18 and two output ports 22, 23 are depicted, the invention is not limited to this, and may include any desired number of input and output ports. Further, such ports need not be provided only at opposite sides/ends of the vessel, but may be disposed at any desired locations of the vessel 1.

The device 4 for generating a gas-infused liquid may generally correspond to a system as shown and discussed in relation to FIGS. 1-5B of U.S. Ser. No. 14/991,534, including a pressure vessel into which liquids and gasses are introduced under high pressures such that the gasses are infused, dispersed or dissolved into the liquids at desired concentrations, which include very high, super-saturated concentrations. Although the specifics of the system as shown in FIGS. 1-5B of U.S. Ser. No. 14/991,534 are not repeated here, such system is very effective for producing, on a continuous or batch basis, liquids which are infused with a large amount of gas(es). The amount of gas which can be infused into a liquid in a pass through the device 4 is based on several factors, a very important one of which is the level of pressure which can be achieved in the pressure vessel of the device. In U.S. Pat. No. 9,527,046 it is discussed that gas may be stably infused up to 880 ppm, but that is based on used of a pressure vessel operating at approximately 300 psi. With higher pressure levels in the pressure vessel higher levels of gas infusion can be achieved. Of course, the cost of the pressure vessel that can handle higher pressure levels is typically higher than the cost of pressure vessels that can handle lower pressure levels. Also, there are more safety concerns that must be addressed with higher pressure levels.

The means 5 for stabilizing the gas-infused liquid after it is discharged from the system 4 and for flowing the stabilized, gas-infused liquid into the main treatment vessel 1 may involve one or more of the three dimensional flow path arrangements shown in FIGS. 6A-6D of U.S. Ser. No. 14/991,534, which is incorporated herein by reference, or any other suitable device, including the present inventor's stabilizing flow path arrangement shown in FIGS. 1A, 1B of PCT/US2014/064727, and those disclosed in U.S. Pat. Nos. 7,008,535, 7,924,278, 8,500,104 and 9,308,505. Which ever device(s) are used as the means 5 for stabilizing the gas-infused liquid, the means 5 generally functions to greatly reduce the size of gas bubbles in the gas-infused liquids, as the gas-infused liquids pass through the devices under high pressure such as the pressure in the pressure vessel of the device 4, to very small sizes, e.g., a few nanometers in diameter. The very small sizes of the gas bubbles makes the gas bubbles much more stable within the liquids, as discussed in the above-mentioned patents and patent applications. Although the specifics of the three dimensional flow path arrangements shown in FIGS. 6A-6D of U.S. Ser. No. 14/991,534 are not repeated here, such flowpath arrangement is particularly effective in stabilizing gas-infused liquids to the point where the gas may be considered as being completely dissolved in the liquid as explained in U.S. Ser. No. 14/991,534.

In the exemplary embodiment of present FIG. 1, use of the devices 4, 5 for generating a gas-infused liquid is somewhat modified from use of the system as shown in FIGS. 1-6D of U.S. Ser. No. 14/991,534 in that in the present invention after the stabilized, gas-infused liquid has been generated and dispersed into the main treatment vessel 1, a portion of such liquid may be withdrawn from the vessel, again stably infused with more of the gas in devices 4, 5 and returned into the main vessel 1 in a treatment operation. In previously disclosed system of U.S. Ser. No. 14/991,534 it is simply discussed that liquid is infused with gas, stabilized and discharged. By stably infusing gas into a liquid via multiple passes through the means 4, 5 the liquid may be stably infused with a larger amount of the gas than is possible with a single pass through the devices 4, 5. This may cause a larger number of gas bubbles to be released within the lower liquid layer, for more efficient processing of the liquid being treated. This is discussed further below. Of course, the device(s) used as the stabilizing means 5 according to the present invention, including the three dimensional flow path arrangements shown in FIGS. 6A-6D of U.S. Ser. No. 14/991,534, may be used without passing any portion of the stabilized, gas-infused liquid through the infusing and stabilizing means 4, 5 more than once.

In present FIG. 1 three of the stabilizing means or devices 5 are provided which are all connected to a discharge line 17 leading from the system 4 such that each of the means/device 5 stabilizes a portion of the gas-infused liquid generated by the device 4, and discharge the stabilized, gas-infused liquid into different parts of a lower liquid layer 6 in the vessel 1. Although the gas-infused liquid could be stabilized and discharged into the vessel 1 using a single means/device 5, it may be advantageous to use a plurality of the flow path arrangement 5 to better assure that the lower liquid layer 6 will be more uniform completely therethrough and promote a more uniform treatment of the liquid or solution to be treated.

As explained in U.S. Ser. No. 14/991,534, it is desirable for the gas-infused liquid to be discharged from the means/devices 5 into the lower liquid layer 6 in as laminar a manner as possible to avoid cavitation that would cause some of the infused gas to be released, from the stabilized, gas-infused liquid, and also that outlet tip end of each of the means/devices 5 should have as thin of wall thickness as possible, and to be squared and have no obstructions associated therewith for thereby avoiding or minimizing cavitation in the gas-infused liquid being discharged.

The means for removing any solids that may accumulate in a bottom portion of the main treatment vessel 1 may include discharge valve 25, a pump 10 such as a diaphragm solids pump, filter system 11, and return line 26 for returning filtered liquid back into the lower liquid layer 6 within the vessel 1 via return port 19. This means can be operated in any appropriate manner, such as on a timed basis throughout a treatment operation for periodically removing any solids that have accumulated in the bottom portion of the vessel 1, when a fluid pressure across or within the filter system 11 reaches a preset threshold, etc. In a filtering operation, the valve 25 is opened, some of the gas-infused liquid from the liquid layer 6 and solid matter contained therein will be withdrawn from the vessel 1 by gravity and the pump 10, passed through the filter system 11, which may be any appropriate filter system for the solid matter being removed, and then the filtered, gas-infused liquid is returned into the vessel 1 via return line 26 and return port 19.

The means for treating any gas(es) that may be generated and collected in the main treatment vessel 1 may include an air pump 12, air dam 21, filter 14, and coarse air diffuser 15. Gasses that may produced and released in the treatment of the liquid or solution to be treated 9, such as crude oil, together with gas that is released from the gas-infused liquid layer 6 during the treatment operation will rise up and collect in a space 13 at the upper portion of the treatment chamber within the vessel 1. Because the gasses that may be produced and released during the treatment operation may be harmful or environmentally unfriendly, e.g., toxic or noxious, they should not be directly released from the vessel 1 into the atmosphere, but instead be treated or eliminated before the collected gasses and be released into the atmosphere or other wise disposed of. The means used to achieve this purpose in the embodiment of FIG. 1 takes a multi-step approach. First, some amount of the collected gasses are continuously withdrawn from the collection space at outlet 27, these gasses are drawn through the air pump 12 and then injected back into the lower liquid layer 6 within the vessel 1 via the coarse air diffuser 15, which may be a tubular manifold having numerous tiny opening formed along the length thereof, so that the gases are discharged as tiny, micro size bubbles into the lower liquid layer 6 where they will be infused, dispersed and/or dissolved to some extent in the liquid layer 6. Secondly the air dam 21 may be provided at an upper portion of the vessel occupying part of the space 13 so that some of the gasses passing up through the various liquid layers in the vessel 1 will be captured by the air dam. The air dam may equalize pressure within the vessel 1 and atmospheric pressure and release the captured gasses through outlet port 14 to atmosphere. Alternately, the captured gasses may be further collected/stored after being discharged through the port 14, especially if the captured gasses have some value.

Although not shown, a filter may be provided through which gasses discharged at the outlet port 14 have to pass before being released to the atmosphere, which filter would, for example, remove any noxious and toxic elements, positive ions, and the like in the gasses so that these elements are not released into the atmosphere. For example, such a filter may include activated carbon or charcoal, wood chips, etc. as appropriate based on the elements which need to be removed.

Operation of the System

An exemplary operation of the system of FIG. 1 will now be described. The exemplary operation may involve treatment of sour crude oil, hydrocarbon tank bottom liquids, and the like to remove any solids therefrom, as well as remove any hydrogen sulfide ($H_2S$) and/or other undesirable components, and may be a continuously run operation with the crude oil being continuously introduced via inlet port 18 and different liquid portions of the treated liquid oil being discharged at outlet ports 22, 23. In this exemplary operation, the desirable liquid components of the treated crude oil or similar liquid may be discharged at the lower outlet port 22 to a first storage or the like 2 and the undesirable liquid components of the treated crude oil may be discharged at the higher outlet port 23 to a second storage or the like 3. The treatment chamber within the vessel 1 may be maintained at any appropriate temperature and pressure, but temperatures at or around standard temperature, e.g., 18-30° C., and pressures at or around standard pressure, e.g. 0.5-1.5 atmospheres, would be suitable. Generally, however, the treatment of hydrocarbon liquids using the system and method of the present invention may be more efficiently conducted at lower temperatures. Device(s) for controlling the temperature of the hydrocarbon liquid or other liquid to be treated and/or the temperature of the stabilized, gas-infused treatment liquid, such as a chilling device and a heating device, may be included with the system.

As depicted, in this operation the lower liquid layer 6 occupies a lowest portion of the treatment chamber within the vessel 1 and contains stabilized, gas-infused liquid introduced into the treatment chamber via the means 5 including one or more devices 5 for stabilizing the gas-infused liquid after it is discharged from the means/device 4 and through one or more inlet ports 19 associated with the means for removing any solids that may accumulate in a bottom portion of the main treatment vessel 1. Water is an appropriate liquid for forming the lower liquid layer 6 in the treatment of crude oil and other hydrocarbon liquids, and appropriate gasses for being stably infused into the water for treatment of crude oil and other hydrocarbon based liquids include oxygen and carbon dioxide. Carbon dioxide typically works better than oxygen for treating hydrocarbon liquids because it includes carbon, e.g., water infused with carbon dioxide will cause less emulsification with the hydrocarbon liquid being treated than water infused with oxygen, and the water infused with carbon dioxide will be more efficient and/or effective in treating the hydrocarbon liquid being treated than water infused with oxygen. However, oxygen is much less expensive to produce, e.g., separate from air, than carbon dioxide because air contains much more oxygen than carbon dioxide, so that oxygen is more cost effective to be used in the operation.

The crude oil or other hydrocarbon liquid to be treated may be introduced into the treatment chamber at one side or end of the vessel through one or more of the inlet ports 18 and form a volume 9 of gelatinous untreated liquid near the inlet port(s). The volume 9 floats above the lower liquid layer 6 because it has a lower specific gravity than the gas-infused water in the lower liquid layer 6, and an interface will be formed between the hydrocarbon liquid and the gas-infused water of the lower layer 6. Based on the injected nature of the hydrocarbon liquid and the fact that it is being discharged from the vessel 1 via outlet ports 22, 23 at the opposite side or end of the vessel, the hydrocarbon liquid will tend to flow or move from the inlet port(s) 18 toward the outlet ports 22, 23, and as it does so it is treated by gas bubbles released from the gas-infused water in the lower layer 6, e.g., very small nano-sized gas bubbles which have stably infused into the liquid via means/devices 4, 5 and other small bubbles which have been discharged into the lower layer 6 via the coarse air diffuser 15. As the released gas bubbles rise up through the volume 9 of hydrocarbon liquid, they cause undesired components/contaminants in the hydrocarbon liquid, e.g., various solid, liquid, and gaseous components, to separate from the hydrocarbon liquid, and also causes the hydrocarbon liquid to separate into at least two layers 7, 8 having components with different specific gravities. Of these two layers, the intermediate layer 7 directly contacting the lower layer 6 will typically contain the primarily desired components, e.g., sweet crude oil, that are discharged via port 22, while the higher layer 8 will typically contain less desirable components, e.g., rag oil, which are discharged via port 23.

Particularly, as the hydrocarbon liquid flows through the vessel it will be treated by the gas-infused water of the lower layer 6 because gas will be released from the gas-infused water in the form of nano bubbles and micro bubbles, as explained below, and the gas molecules in the bubbles will bond, e.g., via covalent bonding and/or ionic bonding, to the hydrocarbon molecules as the bubbles rise through the hydrocarbon liquid. Such molecular level bonding of the gas molecules to the hydrocarbon molecules is very effective for promoting separation of solid matter from the hydrocarbon liquid because the gas molecules displace or reduce the density of the hydrocarbon liquid, which causes the solid matter, e.g., particulates of micro size solids, to be displaced from the hydrocarbon molecules, after which the displaced solid matter will sink through the hydrocarbon liquid and the gas-infused water in the lower liquid layer 6 via gravity and collect in the bottom portion of the vessel 1, again, where the collected solid matter will be periodically discharged from the vessel. The collected gas which is recirculated through the lower liquid layer 6 via the air pump 12 and the coarse air diffuser 15 will also have some effect in treating the hydrocarbon liquid as it floats upwardly therethrough in the form of larger, coarse bubbles, but much less so than the nano bubbles and micro bubbles stably infused in the water via the means/devices 4, 5. The molecular level bonding of the gas molecules to the hydrocarbon molecules is also effective for promoting separation of other gas molecules, including hydrogen sulfide ($H_2S$), from the hydrocarbon liquid. Once separated from the hydrocarbon liquid, these other gas molecules float upwardly in the vessel 1 and accumulate in the space 13 and in the air dam 21, where they can be safely removed and discharged as discussed above.

Further, when the nano bubbles and micro bubbles rise up through the hydrocarbon liquid as such liquid flows across the treatment chamber to the outlet ports 22, 23, the continuous rise of the nano and micro bubbles supersaturates the hydrocarbon liquid with the gas contained in the bubbles, which displaces some portions of the hydrocarbon liquid to a lesser density at a molecular level. This very advantageously causes undesirable or contaminating organic matter of lesser density within the hydrocarbon liquid to rise upwardly toward the upper surface of liquid in the vessel 1, thus separating the hydrocarbon liquid introduced via port(s) 18 into the different layers 7, 8 based on density, which essentially corresponds to molecular structure, by the time the liquid is discharged from the vessel 1 via the ports 22, 23.

While only two separate layers 7, 8 are depicted in the exemplary embodiment, the invention is not limited to this as persons skilled in the art will understand from the present disclosure that it is certainly possible to separate the hydrocarbon liquid into more than two layers by various means, e.g., increasing the amount of micro and nano bubbles that that are floated upwardly through the hydrocarbon liquid being treated by: increasing the size/length of the vessel 1 to extend the distance between the input port(s) and outlet ports; varying a rate at which the hydrocarbon liquid flows through the vessel and/or withdrawing a larger portion of the liquid in the lower layer 6 from the vessel 1 or withdrawing the liquid at a faster rate so that more of the liquid is re-infused and stabilized with more gas via multiple passes through the means/devices 4, 5; joining two or more of the systems in series so that the liquids being discharged from one system are then further treated in the next system(s) to further separate components of the liquid by density/molecular structure; etc.

In terms of the micro bubbles and nano bubbles being released from the gas-infused water in the lower layer 6 within the vessel, this occurs in the system according to the present invention even though the gas is infused in the water in a very stabilize manner via the means including one or more of the means/devices 5. Particularly, the gas-infused water contained in the lower liquid layer 6 will reach a maximum saturation of the gas in the water at what ever temperature and pressure the vessel 1 is maintained at, e.g., standard temperature and pressure. For example, the water in the lower liquid layer 6 may achieve a maximum concentration of oxygen or carbon dioxide of approximately 640 mg/l, which generally corresponds to ppm, at standard temperature and pressure. The maximum saturation of the gas in the water relates to the level of gas infusion achieved by the device 4 and the stabilization means/device 5, which as explained in U.S. Ser. No. 14/991,534 may be as high as 880 mg/l, which equates to approximately 40% by volume. Then by continuously augmenting infusion of gas into the gas-saturated lower liquid layer 6 by passing or re-circulating a portion of the liquid from the lower layer through the means/devices 5 multiple times, the amount of infused gas in the lower liquid layer 6 will increase, and will correspondingly increase the amount of infused gas that will be released from the liquid layer 6 in the form of very small, nano-sized gas bubbles. Particularly, the additional amount of infused gas introduced into the lower liquid layer 6 via the recirculated and re-infused water, e.g., 5-20 pounds of gas/hr, will be released from the lower liquid layer 6 in the form of the nano bubbles and micro bubbles that then rise upwardly through the hydrocarbon liquid to effect changes in the hydrocarbon liquid at a molecular level as discussed above.

The system and method as described herein are very advantageous in comparison to conventional treatments of hydrocarbon liquids, e.g., heat-based distillation and refinement of crude oil, as will be appreciated by persons skilled in the art. For example, the system and method of the present invention can turn sour crude oil having low market value into sweet crude oil having high market value in a relatively quick, and very efficient manner, and can do so even in the locations where the crude oil is extracted from the ground, e.g., the system including the main treatment vessel 1 and the means/devices 4, 5 could be provided on a semi-trailer and hauled to any desired site. Further, the present inventor has tested the processed hydrocarbon liquid which is produced by the system and method of the present invention and has verified that the infusion of gas, oxygen and/or carbon dioxide, into the hydrocarbon liquid via the treatment operation does not disrupt the integrity of the hydrocarbon molecule even though the micro and nano bubbles of gas act at a molecular level on the hydrocarbon liquid.

In the above description of the system and method of the present invention, the treatment of the hydrocarbon liquids primarily involves use of the stabilized, gas-infused treatment liquid. However, the present invention may also involve use of various chemical treatments which would be added to cause various reactions which are helpful to treat the hydrocarbon liquids. For example, in the treatment of hydrocarbon liquids such as crude oil containing sulfur, it may be desirable to add sodium hydroxide (NaOH) and/or other reagents which react with the crude oil for helping to release the sulfur contained therein so that the sulfur may be removed from the crude oil more efficiently and/or to a greater extent than is possible using only the stabilized, gas-infused treatment liquid as discussed above.

While the above discussion of the system embodiment shown in FIG. 1 and the treatment operation involving same has been in relation to treatment of hydrocarbon liquids, the invention is not limited to this. In fact, the exemplary embodiment shown in FIG. 1 may also be used for treating contaminated aqueous solutions in a continuous operation or batch operation as well, although the system may be operated differently from how it is operated for treating hydrocarbon liquids.

For example, an aqueous solution containing undesired solids or other contaminants may similarly be treated in the system of FIG. 1. Examples of such aqueous solutions include contaminated water that is extracted with crude oil from the ground, water that is extracted from the ground with fracking operations, waste solutions from diary farms, poultry farms, etc. In such a treatment operation, there may only be one liquid layer in the treatment vessel 1, i.e., a layer of the contaminated aqueous solution that is being treated, the contaminated aqueous solution may be directly infused with oxygen and/or other gas(ses) using the means/devices 4, 5, and then dispersed into a lower portion of the pressure vessel 1 beneath an upper surface of the liquid layer in the vessel. Further, some portion of the liquid within the vessel may be withdrawn from an upper portion of the liquid layer in the vessel, again passed through the means/devices 4, 5 for being stably infused with additional amounts of the gas, and reintroduced into the liquid layer within the treatment chamber. Because only the aqueous solution/liquid to be treated is involved, some modifications may be made in how the aqueous solution is introduced into and withdrawn from the treatment chamber, e.g., the aqueous solution may only be introduced into a lower portion of the chamber via the means/device(s) 5 without any solution being introduced via input port(s) 18, the treated solution may be withdrawn from the chamber from discharge port(s) 22 or 23 at only one level of the liquid layer near an upper surface thereof, etc. Of course, the aqueous solution could be introduced into the treatment chamber via port(s) 18, as well as through the means/device(s) 5, and could be withdrawn through discharge port(s) at more than one level of the treatment chamber, depending on the aqueous solution being treated, the results desired, etc. Again, such treatment operation may be conducted in a continuous or batch manner.

Other aspects of the treatment system and method may correspond to those discussed above in relation to treatment of hydrocarbon liquids, including the means for removing any solids that may accumulate in a bottom portion of the main treatment vessel 1 including a pump 10 and filter system 11, and the means for capturing, treating and/or releasing any gas(es) that may be generated or released and collected in an upper portion of the main treatment vessel including pump 12, air dam 21, filter 14, and coarse air diffuser 15. Further, the treatment method may also involve use of various chemical treatments which would be added to cause various reactions which are helpful to treat the aqueous solutions, e.g., for promoting release of various contaminants. For example, when an aqueous solution contains boron as a contaminant, it may be desirable a reagent which adjusts the pH of the solution in order to facilitate release of the boron.

In such a treatment operation of a contaminated aqueous solution, again, treatment of the solution is primarily effected through release of very small, nano-sized gas bubbles from the stabilized, gas-infused liquid. These nano bubbles rise up through the single liquid layer and as they do so the gas molecules in the bubbles will bond, e.g., via covalent bonding and/or ionic bonding, to the water molecules as the bubbles rise through the aqueous solution. Similarly to the treatment of hydrocarbon liquids, such molecular level bonding of the gas molecules to the water molecules is very effective for promoting separation of solid matter from the aqueous solution because the gas molecules displace or reduce the density of the aqueous solution, which causes the solid matter, e.g., particulates of micro size solids, to be displaced from the water molecules, after which the displaced solid matter will sink through the single gas-infused aqueous solution in the treatment chamber via gravity and collect in the bottom portion of the vessel 1, again, where the collected solid matter will be periodically discharged from the vessel. The collected gas which is recirculated through the lower liquid layer 6 via the air pump 12 and the coarse air diffuser 15 will also have some effect in treating the aqueous solution as it floats upwardly through the aqueous solution in the form of larger, coarse bubbles, but much less so than the nano bubbles and micro bubbles stably infused in the aqueous solution via the means/devices 4, 5. The molecular level bonding of the gas molecules to the water molecules is also effective for promoting separation of other gas molecules, from the aqueous solution. Once separated from the aqueous solution, these other gas molecules float upwardly in the vessel 1 and accumulate in the space 13 and in the air dam 21, where they can be safely removed and discharged as discussed above. Stokes Law applies to this treatment of an aqueous solution.

The treatment of an aqueous solution according to the present invention is somewhat analogous to a dissolved air flotation (DAF) operation, but the use of the means/devices 4, 5 for stably infusing gasses in the aqueous solutions being treated results in a much greater efficiency/productivity in the treatment of the aqueous solutions than has been previously possible.

Use of the system and method of the present invention for treating aqueous solutions to remove solids and other contaminants therefrom as discussed above also provides significant advantages over conventional treatments of aqueous solutions. For example, there is a very significant amount of contaminated water extracted from the ground along with crude oil extraction, as well as in fracking operations for extracting gas and oil from the ground. Currently, such contaminated water is simply reinserted into the ground, which is a huge waste of the water and the energy involved in reinserting the water, especially in arid regions where there is a need for clean water to irrigate crops, etc. By using the system and method of the present invention on location where such crude oil extraction and fracking operations occur, the contaminated water can be efficiently cleaned and then used for irrigating crops, etc. rather than being reinserted into the ground.

Other examples of uses to which the system of the present invention may be applied are chemical treatments such as sodium solidification treatment of a saline aqueous solution using water infused with carbon dioxide and biological treatments such as noxic or anoxic digestion using water infused with oxygen or other appropriate gasses. For many of these applications the treatment operation a batch-type treatment operation or sequential batch treatment operation may be desired instead of continuous treatment operation, but the system 1 and treatment method of the present invention function appropriately in any these manners.

Again, one such use may involve treatment of aqueous waste from a dairy farm or poultry farm. Such waste typically includes high levels of phosphorous and ammonia ($NH_3$). For treating such waste a sequential batch treatment operation is most appropriate. In a first treatment vessel a batch of the waste would be subjected to a noxic batch treatment operation, and then the waste batch would be introduced into a second treatment vessel where it would be subjected to an annoxic batch treatment operation which supports de-nitrification of bacteria or the treatment of phosphorous.

Persons skilled in the art will readily appreciate that the systems and methods of the present invention may be applied for treating all types of liquids and solutions to remove undesirable components thereof by tailoring the treatment operation to particular liquid or solution and the component(s) thereof which are sought to be removed. Treatment of aqueous solutions has a particular importance given the absolute need that living creatures and plants have for clean water to drink and survive, and the systems and methods of the present invention may be very usefully applied in this regard.

The foregoing description is given for clearness of understanding only, and no unnecessary limitations should be understood therefrom, as modifications within the scope of the invention may be apparent to those having ordinary skill in the art and are encompassed by the claims appended hereto.

What is claimed is:

1. A method for treating hydrocarbon based liquids and solutions for separating components thereof, the method including steps of:
providing a treatment vessel having a treatment chamber therein;
generating a gas-infused treatment liquid containing a supersaturated amount of gas under elevated pressure;
stabilizing the gas-infused treatment liquid by reducing a size of bubbles in which the gas is contained in the treatment liquid;
inputting the stabilized, gas-infused treatment liquid into a lower portion of the treatment chamber to form a lower liquid layer including the stabilized, gas-infused treatment liquid in the lower portion of the treatment chamber;
introducing a hydrocarbon liquid to be treated at one portion of the treatment vessel at a level above the lower liquid layer, and withdrawing components of the hydrocarbon liquid through at least two outlet ports disposed at different levels at another portion of the treatment vessel above the lower liquid layer such that the hydrocarbon liquid flows from the one portion of the treatment vessel to the other portion thereof;
withdrawing a portion of the liquid from the lower liquid layer, infusing the withdrawn portion of the liquid with an additional amount of the gas, stabilizing the withdrawn portion of the liquid with the additional amount of the gas infused therein by reducing a size of bubbles in which the gas is contained in the treatment liquid, and returning the re-infused and re-stabilized liquid into the lower portion of the treatment chamber such that an amount of the gas is released from the lower liquid layer in the form of micro bubbles and/or nano bubbles which float upwardly through the hydrocarbon liquid.

2. The method according to claim 1, wherein the treatment liquid that is infused with gas is water and the gas(es) that are infused in the treatment liquid includes at least one of oxygen and carbon dioxide.

3. The method according to claim 1 further comprising steps of: collecting any gas released within the treatment chamber at an upper portion of the treatment chamber; withdrawing a portion of the collected gas from the treatment vessel, and injecting the withdrawn portion of collected gas into the lower liquid layer.

4. The method according to claim 1 further comprising steps of: withdrawing a portion of the liquid in the lower liquid layer from a bottom of the treatment chamber together with any solid matter contained therein; filtering the withdrawn portion of liquid to remove the solid matter from; and returning the filtered portion of liquid to the lower liquid layer within the treatment vessel.

5. A method for treating liquids and solutions for separating components thereof, the method including steps of:
providing a treatment vessel having a treatment chamber therein;
infusing a quantity of a liquid to be treated with a supersaturated amount of gas under elevated pressure;
stabilizing the gas-infused liquid by reducing a size of bubbles in which the gas is contained in the liquid;
inputting the stabilized, gas-infused liquid into a lower portion of the treatment chamber to form a liquid layer including the stabilized, gas-infused treatment liquid in the lower portion of the treatment chamber;
withdrawing a portion of the liquid from the liquid layer, infusing the withdrawn portion of the liquid with an additional amount of the gas, stabilizing the withdrawn portion of the liquid with the additional amount of the gas infused therein by reducing a size of bubbles in which the gas is contained in the liquid, and returning the re-infused and re-stabilized liquid into the lower portion of the treatment chamber such that an amount of the gas is released from the liquid layer in the form of micro bubbles and/or nano bubbles which float upwardly through the liquid layer; and withdrawing another portion of the liquid from the liquid layer at a location near an upper surface of the liquid layer.

6. The method according to claim 5, wherein the liquid that is infused with gas is water-based.

7. The method according to claim 5 further comprising steps of: collecting any gas released within the treatment chamber at an upper portion of the treatment chamber; withdrawing a portion of the collected gas from the treatment vessel, and injecting the withdrawn portion of collected gas into the liquid layer.

8. The method according to claim 5 further comprising steps of: withdrawing a portion of the liquid in the liquid layer from a bottom of the treatment chamber together with any solid matter contained therein; filtering the withdrawn portion of liquid to remove the solid matter from; and returning the filtered portion of liquid to the liquid layer within the treatment vessel.

9. The method according to claim 5, wherein throughout operation of the method additional quantities of the liquid to be treated are infused with a supersaturated amount of gas under elevated pressure, stabilized and inputted into the lower portion of the treatment chamber such that the additional quantities become part of the liquid layer in the treatment chamber; and portions of the liquid from the liquid layer are withdrawn at the location near an upper surface of the liquid layer.

10. The method according to claim 1, wherein when the micro bubbles and/or nano bubbles which float upwardly through the hydrocarbon liquid molecules of the gas contained in the bubbles bond to molecules of the hydrocarbon liquid through at least one of covalent bonding and ionic bonding.

11. The method according to claim 5, wherein when the micro bubbles and/or nano bubbles which float upwardly through the liquid layer molecules of the gas contained in the bubbles bond to molecules of the liquid through at least one of covalent bonding and ionic bonding.

* * * * *